United States Patent
Johnson et al.

[19]

[11] Patent Number: 5,840,438
[45] Date of Patent: Nov. 24, 1998

[54] ELECTROCHEMICAL FUEL CELL WITH AN ELECTRODE SUBSTRATE HAVING AN IN-PLANE NONUNIFORM STRUCTURE FOR CONTROL OF REACTANT AND PRODUCT TRANSPORT

[75] Inventors: Mark C. Johnson, Phoenix, Ariz.; David P. Wilkinson, North Vancouver, Canada; Charles P. Asman, Surrey, Canada; Myles L. Bos, Burnaby, Canada; Robert J. Potter, Chalkhouse Green, England

[73] Assignee: Ballard Power Systems Inc., Burnaby, Canada

[21] Appl. No.: 520,133

[22] Filed: Aug. 25, 1995

[51] Int. Cl.[6] ............................ H01M 8/10; H01M 2/14; C25B 11/00; C25B 11/12

[52] U.S. Cl. ................................ 429/30; 429/34; 429/38; 429/39; 429/42; 204/280; 204/284; 204/290 R; 204/294

[58] Field of Search .................................. 429/30, 34, 38, 429/39, 42; 204/280, 284, 290 R, 294

[56] References Cited

U.S. PATENT DOCUMENTS

| 4,459,342 | 7/1984 | Shigeta et al. ............................ 429/34 |
| 4,615,955 | 10/1986 | Amakawa et al. ........................ 429/34 |
| 4,804,592 | 2/1989 | Vanderborg et al. ..................... 429/33 |
| 4,855,193 | 8/1989 | McElroy .................................... 429/30 |
| 5,252,410 | 10/1993 | Wilkinson et al. ........................ 429/33 |
| 5,260,143 | 11/1993 | Voss et al. ................................. 429/13 |
| 5,300,370 | 4/1994 | Washington et al. ..................... 429/34 |
| 5,558,948 | 9/1996 | Doyon ..................................... 429/235 |

FOREIGN PATENT DOCUMENTS

| 0 343 679 | 11/1989 | European Pat. Off. . |
| 654 837 | 11/1993 | European Pat. Off. . |
| 2381835 | 10/1978 | France . |
| 46-22736 | 6/1971 | Japan . |
| 6-150938 | 5/1994 | Japan . |
| 4-95357 | 11/1994 | Japan . |
| 133882 | 2/1919 | United Kingdom . |
| WO 94/05049 | 3/1994 | WIPO . |
| WO 94/11912 | 5/1994 | WIPO . |
| WO 95/08851 | 3/1995 | WIPO . |
| WO 95/22179 | 8/1995 | WIPO . |

Primary Examiner—Arun S. Phasge
Assistant Examiner—Eana Wong
Attorney, Agent, or Firm—McAndrews, Held & Malloy, Ltd.

[57] ABSTRACT

In an electrochemical fuel cell, an electrode substrate has an in-plane nonuniform structure. The electrode substrate having an in-plane nonuniform structure enables controlled transport of reactant toward the electrocatalyst layer and controlled transport of reaction product away from the electrocatalyst layer.

35 Claims, 8 Drawing Sheets

ELECTROCHEMICAL FUEL CELL WITH AN ELECTRODE SUBSTRATE HAVING AN IN-PLANE NONUNIFORM STRUCTURE FOR CONTROL OF REACTANT AND PRODUCT TRANSPORT

FIELD OF THE INVENTION

This invention relates generally to electrochemical fuel cells and, more particularly, to an electrochemical fuel cell with an electrode substrate having an in-plane nonuniform structure for controlling reactant transport toward the electrocatalyst layer and for controlling reaction product transport away from the electrocatalyst layer.

BACKGROUND OF THE INVENTION

Electrochemical fuel cells convert fuel and oxidant to electricity and reaction product. Solid polymer electrochemical fuel cells generally employ a membrane electrode assembly ("MEA") comprising a solid polymer electrolyte or ion exchange membrane disposed between two planar electrode diffusion layers or substrates formed of porous, electrically conductive sheet material, such as carbon fiber paper or carbon cloth. Suitable carbon fiber paper sheet material is available, for example, from Toray Industries, Inc. with grade designations such as TGP090, TGP060 and TGP030 having thicknesses of 0.27 mm, 0.19 mm and 0.10 mm, respectively, and a porosity of approximately 70%. Carbon fiber paper sheet material is also available in other thicknesses and porosities. Typically, the structure of the electrode substrate is substantially uniform, on a macroscopic scale, as it is traversed in-plane (that is, in the x- and y-directions, parallel to the planar major surfaces of the electrode substrate) at any depth.

The MEA contains a layer of electrocatalyst, typically in the form of finely comminuted platinum, at each membrane/electrode substrate interface to induce the desired electrochemical reaction. The electrodes are electrically coupled to provide a path for conducting electrons between the electrodes through an external load.

At the anode, the fuel stream moves through the porous anode substrate and is oxidized at the anode electrocatalyst layer. At the cathode, the oxidant stream moves through the porous cathode substrate and is reduced at the cathode electrocatalyst layer to form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode electrocatalyst layer, oxygen reacts with the hydrogen ions that have crossed the membrane to form water as the reaction product. The anode and cathode reactions in hydrogen/oxygen fuel cells are shown in the following equations:

Anode reaction: $H_2 \rightarrow 2H^+ + 2e^-$

Cathode reaction: $1/2 O_2 + 2H^+ + 2e^- \rightarrow H_2O$

In electrochemical fuel cells employing methanol as the fuel supplied to the anode (so-called "direct methanol" fuel cells) and oxygen-containing air (or substantially pure oxygen) to the cathode, the methanol is oxidized at the anode to produce hydrogen ions (protons) and carbon dioxide. Typically, the methanol is supplied to the anode as an aqueous solution. The hydrogen ions migrate through the ion exchange membrane from the anode to the cathode, and at the cathode electrocatalyst layer, oxygen reacts with the hydrogen ions to form water. The anode and cathode reactions in this type of direct methanol fuel cell are shown in the following equations:

Anode reaction: $CH_3OH + H_2O \rightarrow 6H^+ + CO_2 + 6e^-$

Cathode reaction: $3/2 O_2 + 6H^+ + 6e^- \rightarrow 3H_2O$

In fuel cells employing proton exchange membranes and running at low oxygen stoichiometry, the oxidant stream enters the fuel cell at an initial humidity level, typically between 70% and 100% relative humidity. "Stoichiometry" is the ratio of the amount of reactant supplied to the fuel cell stack to the amount of reactant actually consumed in fuel cell stack (unconsumed reactants exit the fuel cell stack). A hydrogen stoichiometry of 1.35 means that 135 parts of hydrogen are supplied to the fuel cell stack for each 100 parts actually consumed in the fuel cell stack.

In electrochemical fuel cells, the MEA is typically interposed between two fluid flow field plates (anode and cathode plates). The plates act as current collectors, provide support to the MEA, provide means for access of the fuel and oxidant to the anode and cathode surfaces, respectively, and provide for the removal of product water formed during operation of the cells.

As the oxidant stream travels through the fluid flow channels typically formed in the fluid flow field plates of the cell, the stream absorbs water that is produced as the product of the electrochemical reaction. The product water is absorbed either as water vapor or as entrained water droplets. As a result, the portion of the flow field into which the oxidant stream is introduced and through which the oxidant stream initially flows is dryer than the portion of the flow field through which the oxidant stream flows just prior to being exhausted from the fuel cell. In the latter portion of the oxidant flow field, the oxidant stream can become saturated with water, in which case two phase flow occurs, that is, the oxidant stream contains water vapor and also has liquid water entrained in the stream.

Wet and dry regions of the flow field can detrimentally affect fuel cell performance and accelerate the degradation of performance over time. Fuel cell performance is defined as the voltage output from the cell for a given current density; the higher the voltage for a given current density, the better. Control of water transport in the "z" direction (perpendicular to the plane); that is, movement of water in the direction from the cathode electrocatalyst layer to the oxidant flow channels (the "free stream"), is important to optimizing fuel cell performance. The "free stream" is the fluid stream within the reactant distribution channels.

In addition to the control of water transport, control of oxidant transport along the z-axis, that is, movement of oxygen in the direction from the oxidant flow channels or free stream to the cathode electrocatalyst layer, is important to optimizing fuel cell performance. The concentration of oxygen at the electrocatalyst layer directly affects fuel cell performance because oxygen concentration affects the rate of the electrochemical reaction.

Further, at the anode in direct methanol fuel cells, control of methanol transport towards the electrocatalyst layer and transport of carbon dioxide, a product of the oxidation of methanol, away from the anode electrocatalyst layer are important to optimizing fuel cell performance.

It is therefore an object of the invention to improve fuel cell performance by controlling the transport of reaction product through the electrode substrate along the z-axis away from the electrocatalyst layer.

Another object of the invention is to improve fuel cell performance by controlling the transport of reactant through the electrode substrate along the z-axis toward the electrocatalyst layer.

SUMMARY OF THE INVENTION

The above and other objects are achieved by an electrochemical fuel cell in which an electrode substrate has an in-plane nonuniform structure. The fuel cell comprises:

(a) an anode substrate having a pair of oppositely facing major planar surfaces, the anode substrate further having a catalyst disposed on one of the major planar surfaces thereof for promoting the oxidation of a fuel stream;

(b) a cathode substrate having a pair of oppositely facing major planar surfaces, the cathode substrate further having a catalyst disposed on one of the major planar surfaces thereof for promoting the reduction of an oxidant stream to form a reaction product;

(c) a membrane electrolyte interposed between each of the surfaces of the anode substrate and the cathode substrate having catalyst disposed thereon;

(d) an anode separator plate disposed adjacent the major planar surface of the anode substrate facing away from the membrane electrolyte, the anode separator plate having a fuel stream inlet, a fuel stream outlet, and at least one channel for directing the fuel stream between the fuel stream inlet and the fuel stream outlet;

(e) a cathode separator plate disposed adjacent the major planar surface of the cathode substrate facing away from the membrane electrolyte, the cathode separator plate having an oxidant stream inlet, an oxidant stream outlet, and at least one channel for directing the oxidant stream between the oxidant stream inlet and the oxidant stream outlet.

At least one of the anode substrate and the cathode substrate has an in-plane nonuniform structure.

In a hydrogen/oxygen fuel cell, the fuel stream comprises hydrogen, the oxidant stream comprises oxygen, and the reaction product comprises water.

In a direct methanol fuel cell, the fuel stream comprises methanol, the oxidant stream comprises oxygen, the reaction product of the oxidation of the fuel stream comprises carbon dioxide, and the reaction product of the reduction of the oxidant stream comprises water.

In a first embodiment of the improved electrochemical fuel cell, the in-plane nonuniform structure comprises at least one channel formed on the major surface of the cathode substrate facing the cathode separator plate. The at least one channel preferably comprises a plurality of channels. Where the cathode substrate major surface consists of an inlet portion adjacent the oxidant stream inlet and an outlet portion adjacent the oxidant stream outlet, the at least one channel is preferably disposed such that the ratio of the area circumscribed by the at least one channel to the surface area of the substrate in the outlet portion is greater than the ratio of the area circumscribed by the at least one channel to the surface area of the substrate in the inlet portion.

In a second embodiment of the improved electrochemical fuel cell, the in-plane nonuniform structure comprises at least one opening formed in the cathode substrate. The at least one opening extends between both major surfaces of the cathode substrate. The at least one opening preferably comprises a plurality of openings. Where the cathode substrate major surface consists of an inlet portion adjacent the oxidant stream inlet and an outlet portion adjacent the oxidant stream outlet, the ratio of the area circumscribed by the openings to the surface area of the substrate in the outlet portion is greater than the ratio of the area circumscribed by the openings to the surface area of the substrate in the inlet portion.

In a variation of the second embodiment of the improved electrochemical fuel cell, each of the at least one opening extends angularly between both of the cathode substrate major surfaces from a point adjacent the at least one channel formed in the cathode separator plate major surface. In some applications, the at least one opening has a quantity of hydrophilic material disposed therein. In other applications, the at least one opening has a quantity of hydrophobic material disposed therein.

In a third embodiment of the improved electrochemical fuel cell, a portion of one of the cathode substrate major surfaces has a coating layer disposed thereon. The coating layer comprises material that is semipermeable to inhibit water transport. Where the cathode substrate major surface consists of an inlet portion adjacent the oxidant stream inlet and an outlet portion adjacent the oxidant stream outlet, the coating layer is preferably disposed on the inlet portion. In some applications, the cathode substrate major surface having the coating layer disposed thereon preferably faces the cathode separator plate. In other applications, the cathode substrate major surface having the coating layer disposed thereon preferably faces the membrane electrolyte.

In a fourth embodiment of the improved electrochemical fuel cell, the cathode substrate comprises at least two porous electrically conductive sheet materials arranged in substantially the same plane. In one aspect, the cathode substrate comprises a first porous electrically conductive sheet material and at least one opening formed in the cathode substrate, the at least one opening extending between both major surfaces of the cathode substrate. The at least one opening has a quantity of a second porous electrically conductive sheet material disposed therein. Where the cathode substrate consists of an inlet portion adjacent the oxidant stream inlet and an outlet portion adjacent the oxidant stream outlet, the at least one opening is preferably formed in the outlet portion. The first porous electrically conductive sheet material is preferably carbon fiber paper and the second porous electrically conductive sheet material is preferably carbon cloth. Alternatively, the first porous electrically conductive sheet material is preferably carbon fiber paper having a first porosity and the second porous electrically conductive sheet material is preferably carbon fiber paper having a second porosity.

The embodiments defined above comprise an electrode substrate which, on a macroscopic scale, has an in-plane nonuniform structure. In other words, as the structure of the substrate is traversed parallel to its major planar surfaces at some depth, structural discontinuities (over and above those inherent in the microscopic structure of the substrate material) are encountered. Further, the in-plane structural nonuniformities in the substrate may be distributed evenly across the substrate (for example, in a regularly spaced pattern) or may be distributed unevenly to impart different mass transport properties in different regions of the electrode substrate.

DETAILED DESCRIPTION OF THE PREFERRED EMBODIMENTS

Figure 1A:
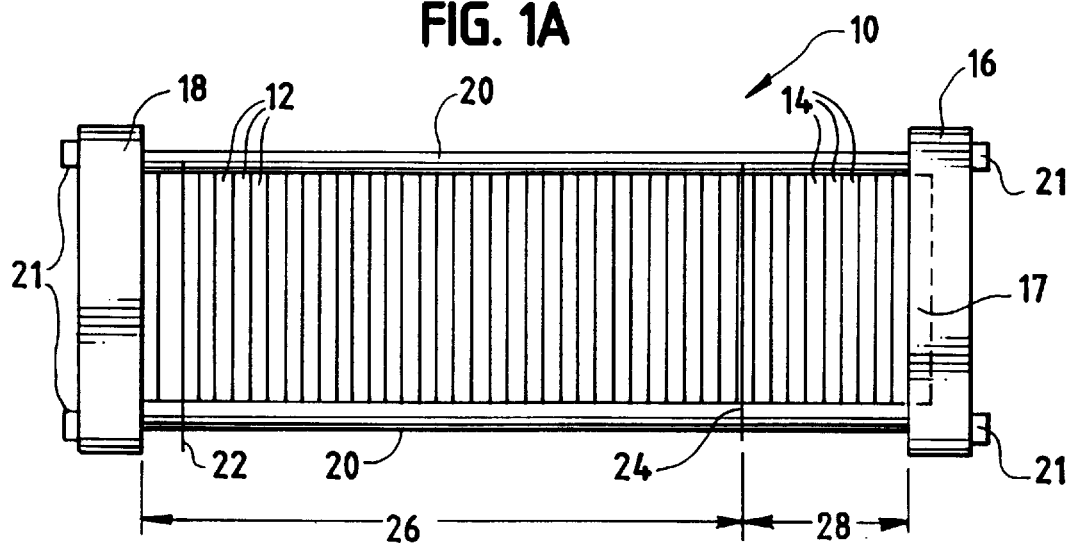
FIG. 1A is a side elevation view of a typical fuel cell stack showing the electrochemically active and humidification sections.

Referring first to FIG. 1A, a fuel cell stack assembly 10 includes an electrochemically active section 26 and a humidification section 28. Stack assembly 10 is a modular plate and frame design, and includes a compression end plate 16 and a fluid end plate 18. An optional pneumatic piston 17, positioned within compression end plate 16, applies uniform pressure to the assembly to promote sealing. Bus plates 22 and 24 located on opposite ends of active section 26 provide the negative and positive contacts, respectively, to draw current generated by the assembly to a load (not shown). Tie rods 20 extend between end plates 16 and 18 to retain and secure stack assembly 10 in its assembled state with fastening nuts 21.

Active section 26 includes, in addition to bus plates 22 and 24, a plurality of fuel cell repeating units 12. Each repeating unit 12 consists of at least one membrane electrode assembly, separator plates and an optional cooling jacket. The repeating units 12 are electrically coupled in series by virtue of the contact between the electrically conductive sheets, separator plates, and optional cooling jackets.

Humidification section 28 includes a plurality of humidification assemblies 14, each assembly 14 consisting of fuel or oxidant reactant flow field plate, a water flow field plate, and a water vapor transport membrane interposed between the reactant flow field plate and the water flow field plate. Humidification section 28 imparts water vapor to the fuel and oxidant streams which are then fed to active section 26, thereby preventing the membranes within the active section from drying out.

Figure 1B:
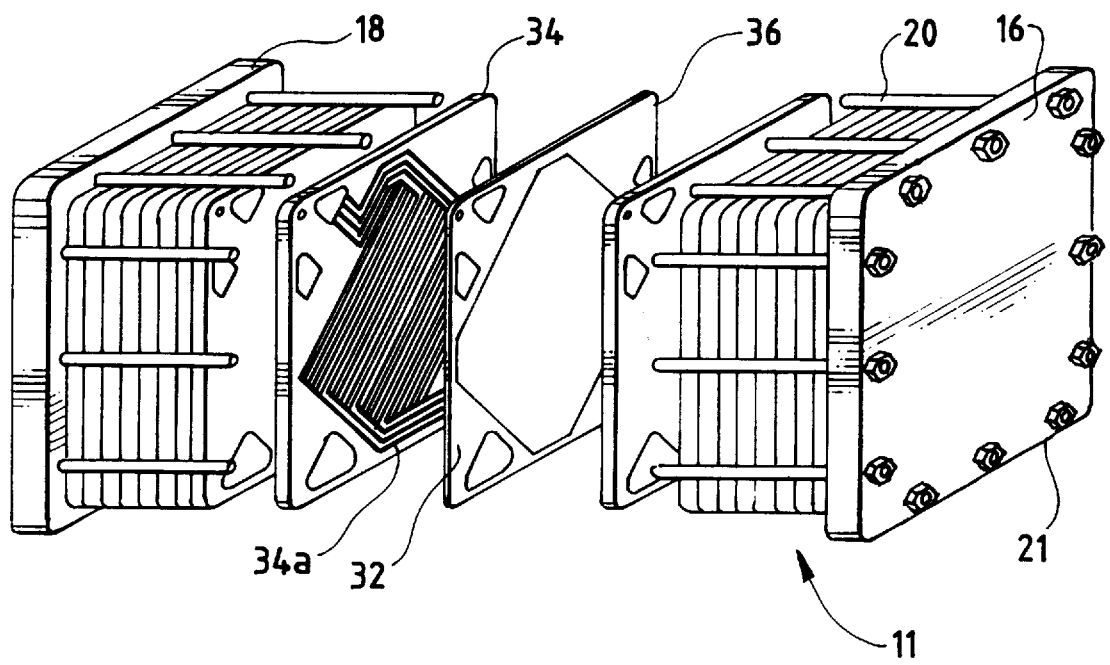
FIG. 1B is an exploded perspective view of a fuel cell stack with an electrochemically active section.

Turning now to FIG. 1B, a fuel cell stack 11 has an active section but does not have a humidification section as part of the stack. Like fuel cell stack 10 in FIG. 1A, stack 11 in FIG. 1B includes a compression end plate 16, a fluid end plate 18, and a plurality of repeating units. Tie rods 20 extend between end plates 16 and 18 to retain and secure stack assembly 11 in its assembled state with fastening nuts 21.

As also shown in exploded form in FIG. 1B, stack 11 includes an anode separator plate 34, a cathode separator plate 36, and a membrane electrode assembly 32 interposed between plates 34 and 36. As shown in FIG. 1B, plate 34 has a plurality of fluid flow channels 34a formed in its major surface facing MEA 32.

Figure 2:
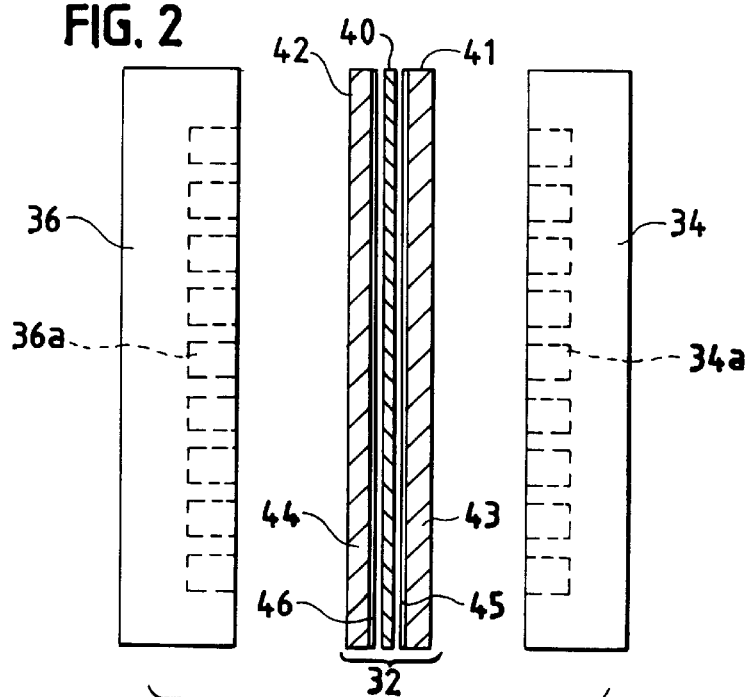
FIG. 2 is an exploded side view of a typical membrane electrode assembly interposed between two separator plates having reactant flow channels formed in the surfaces facing the electrodes.

FIG. 2 illustrates a typical fuel cell 30. Fuel cell 30 includes membrane electrode assembly 32 interposed between anode flow field or separator plate 34 and cathode flow field or separator plate 36. Membrane electrode assembly 32 consists of an ion exchange membrane 40 interposed between two electrodes, namely, anode 41 and cathode 42.

In conventional fuel cells, anode 41 and cathode 42 comprise a substrate of porous electrically conductive sheet material 43 and 44, respectively, preferably carbon fiber paper or carbon cloth, having planar major surfaces. Each substrate has a thin layer of electrocatalyst 45 and 46, respectively, preferably finely comminuted platinum, disposed on one of the major surfaces at the interface with membrane 40 to render each electrode electrochemically active.

As further shown in FIG. 2, anode separator plate 34 has at least one fuel flow channel 34a engraved, milled or molded in its surface facing anode 41. Similarly, cathode separator plate 36 has at least one oxidant flow channel 36a engraved, milled or molded in its surface facing cathode 42. When assembled against the cooperating surfaces of electrodes 41 and 42, channels 34a and 36a form the reactant flow field passages for the fuel and oxidant, respectively.

Figure 3:
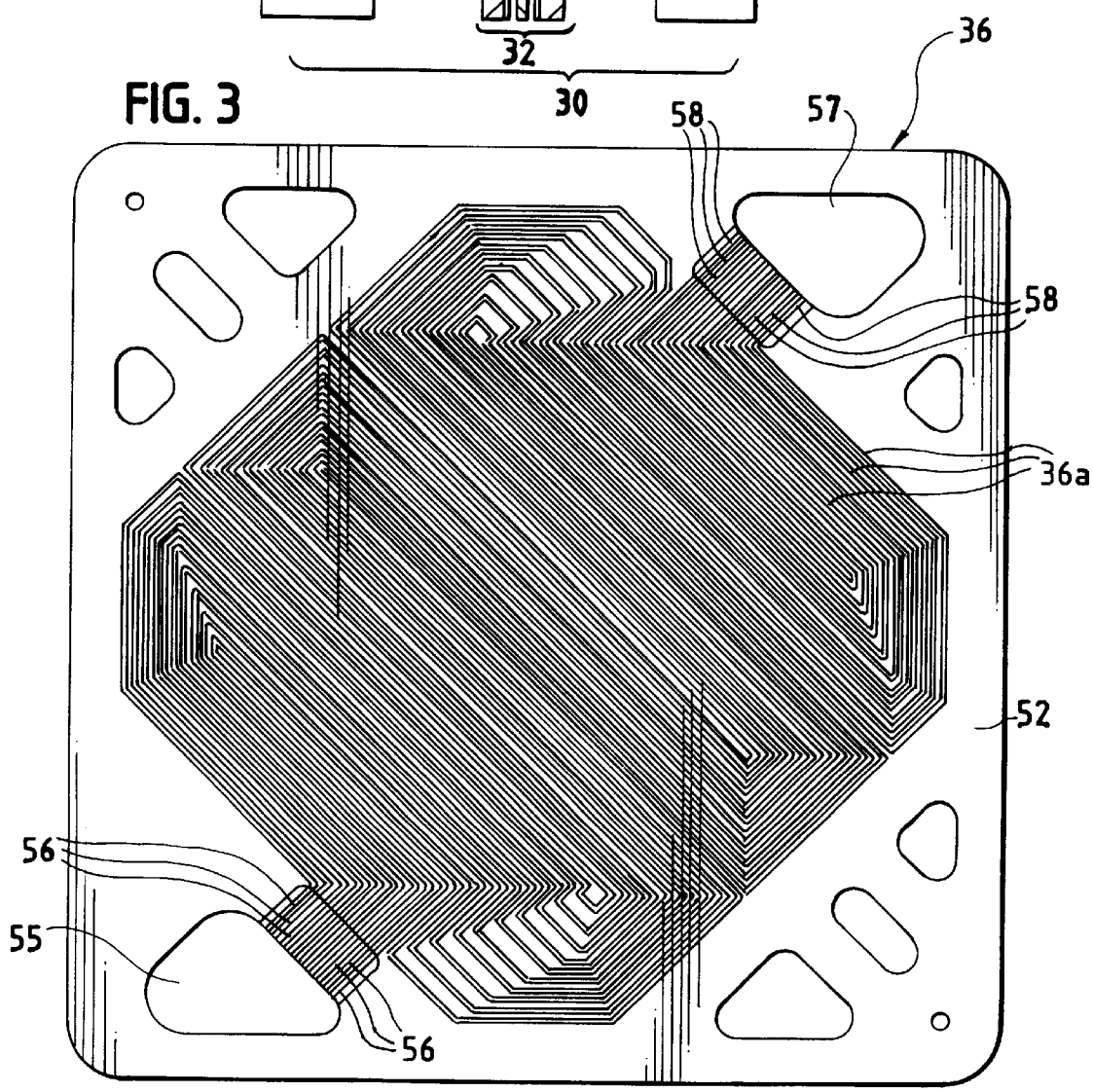
FIG. 3 is a plan view of the cathode separator plate for the fuel cell of FIG. 2, illustrating the plurality of flow channels for directing an oxidant stream between an inlet and an outlet.

FIG. 3 shows that channels 36a of cathode separator plate 36 are preferably engraved, milled or molded as a plurality of separately formed oxidant flow channels 36a which extend across the major surface of the cathode separator plate in a serpentine pattern. Channels 36a include inlet channel portions 56 and an outlet channel portions 58, which are directly connected to oxidant inlet manifold opening 55 and oxidant outlet manifold opening 57, respectively. In operation, a pressurized oxidant stream is directed into inlet manifold opening 55, from which the stream is split among inlet channels 56. The oxidant stream is then directed through channels 36a to outlet channel portions 58, from which the stream is exhausted into oxidant outlet manifold opening 57. The multiple serpentine channel flow field plate configuration illustrated in FIG. 3 is more completely described in U.S. Pat. No. 5,108,849.

Figure 4:
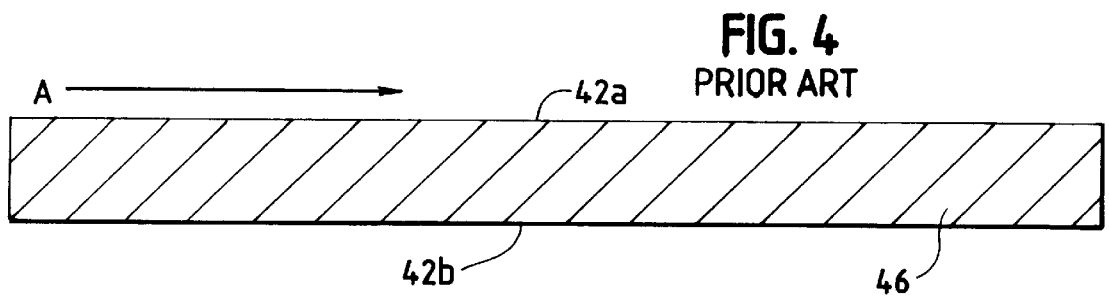
FIG. 4 is a cross-sectional view of a conventional (prior art) cathode substrate for the fuel cell of FIG. 2, schematically illustrating the oxidant stream flow in the direction of arrow A.

FIG. 4 shows conventional (prior art) cathode substrate 42 of fuel cell 30 in FIG. 2. Cathode substrate 42 comprises a substantially continuous sheet of electrically conductive material, typically carbon fiber paper, and has opposite major planar surfaces 42a, 42b. The oxidant stream flows in the direction of arrow A within at least one channel formed in the cathode flow field/separator plate (not shown) adjacent the surface 42a of cathode 42. Surface 42b has a thin layer of electrocatalyst (not shown), preferably finely comminuted platinum, disposed thereon at the interface with adjacent membrane (see FIG. 2). In the conventional cathode substrate illustrated in FIG. 4, the structure of the substrate is substantially uniform, on a macroscopic scale, as it is traversed in-plane at any depth.

Figure 5:
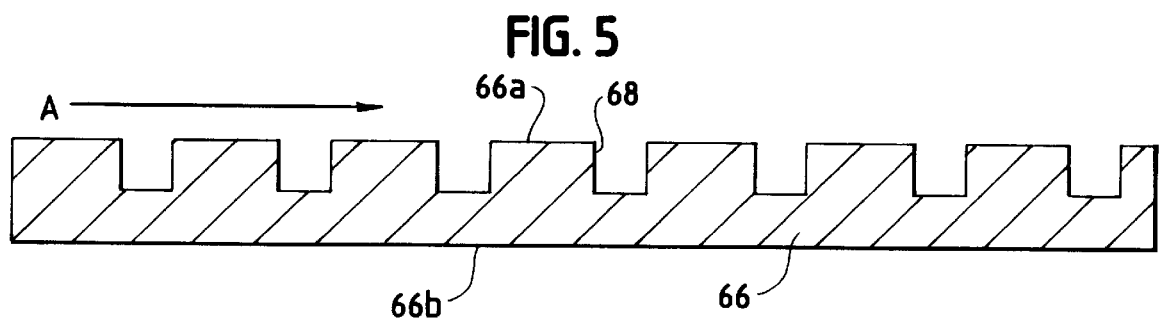
FIG. 5 is a cross-sectional view of a cathode substrate having a grooved surface facing the oxidant flow field for the fuel cell of FIG. 2, schematically illustrating the oxidant stream flow in the direction of arrow A.

FIG. 5 shows a cathode substrate 66 having a grooved surface 66a facing the oxidant flow field for fuel cell 30 of FIG. 2. The grooved surface has at least one channel 68 formed therein. Channels 68 can be oriented in any direction with respect to the flow field channels in the adjacent separator plate. Preferably, however, channels 68 are angularly oriented to improve oxidant transport to area beneath the lands (the raised areas between the channels) of the adjacent separator plate.

In FIG. 5, the oxidant stream flows in the direction of arrow A. Surface 66b has a thin layer of electrocatalyst (not shown), preferably finely comminuted platinum, disposed thereon at the interface with adjacent membrane (see FIG. 2).

Figure 6:
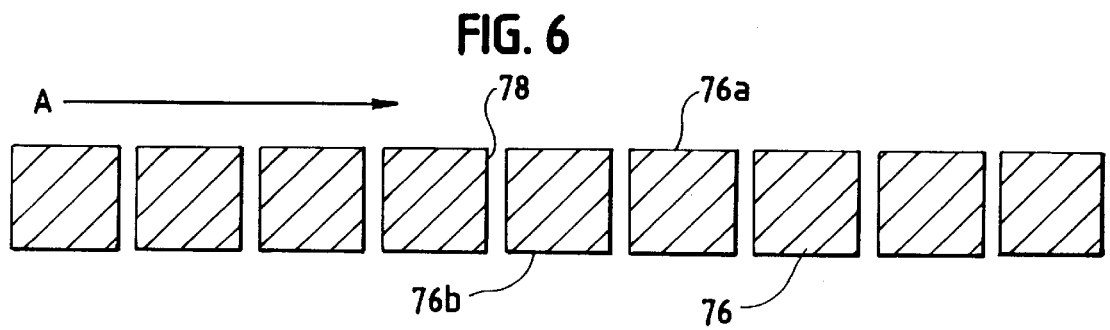
FIG. 6 is a cross-sectional view of a cathode substrate having openings piercing both surfaces for the fuel cell of FIG. 2, schematically illustrating the oxidant stream flow in the direction of arrow A.

FIG. 6 shows a cathode substrate 76 having openings 78 which extend between and pierce both surfaces 76a, 76b of cathode substrate 76. The oxidant stream flows in the direction of arrow A. Surface 76b has a thin layer of electrocatalyst (not shown), preferably finely comminuted platinum, disposed thereon at the interface with adjacent membrane (see FIG. 2).

The grooved and pierced embodiments of FIGS. 5 and 6 are designed to control product water transport away from and/or oxygen transport toward the electrocatalyst layer. The grooved or pierced embodiments are intended to be employed in regions of the electrode substrate in which excess product water accumulates. In the grooved embodiment of FIG. 5, the grooving could be accomplished with varying cross-sectional configurations, such as, for example, a ramp, rectangular, trapezoidal, triangular, or semicircular cross-sectional shape. The depth and width of the grooves can be adjusted to provide control of oxidant transport toward the electrocatalyst layer and/or control of product water transport from the electrocatalyst layer.

Figure 7:
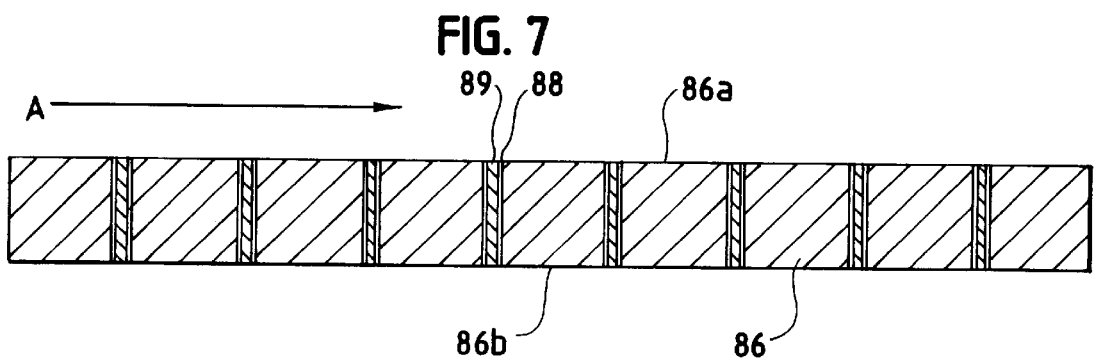
FIG. 7 is a cross-sectional view of the cathode substrate of FIG. 6 in which hydrophilic material is embedded in the pierced openings, schematically illustrating the oxidant stream flow in the direction of arrow A.

FIG. 7 shows a cathode substrate 86 in which hydrophilic fibers 89 are embedded in the openings 88 which extend between and pierce both surfaces 86a, 86b of cathode 86. The oxidant stream flows in the direction of arrow A. Surface 86b has a thin layer of electrocatalyst (not shown), preferably finely comminuted platinum, disposed thereon at the interface with adjacent membrane (see FIG. 2).

The employment of hydrophilic material in FIG. 7 enhances product water removal from the electrocatalyst layer adjacent the cathode substrate 86. In this regard, hydrophilic fibers could also be woven into the sheet material in the desired quantity and in the desired location(s) to control the rate of water removal.

Figure 8:
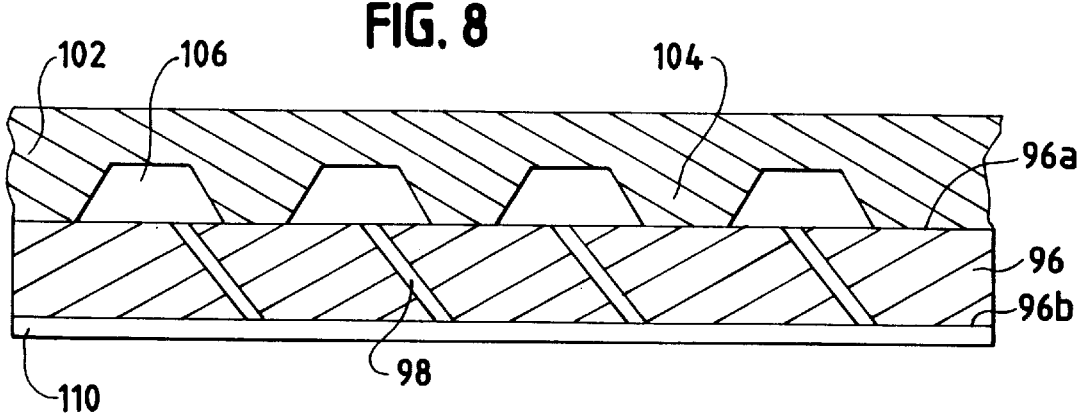
FIG. 8 is a cross-sectional view of a cathode substrate having angled openings piercing both surfaces for the fuel cell of FIG. 2.

FIG. 8 shows a cathode substrate 96 having angled openings 98 which extend between and pierce both surfaces 96a, 96b of cathode substrate 96. The oxidant stream flows within at least one channel 106 formed in the cathode flow field/separator plate 102 adjacent surface 96a of cathode substrate 96. Surface 96b has a thin layer 110 of electrocatalyst, preferably finely comminuted platinum, disposed thereon at the interface with adjacent membrane (not shown). As shown in FIG. 8, the angled pierced openings 98 of cathode substrate 96 are preferably oriented such that the openings extend from surface 96a at a point adjacent oxidant flow channel 106 to surface 96b at a point below landing areas 104 of cathode flow field/separator plate 102.

The angled pierced openings in the embodiment of FIG. 8 enhances oxygen transport toward the electrocatalyst layer beneath the landing areas 104 of plate 102. In conventional, unpierced embodiments, electrochemical activity is generally reduced beneath the landing areas. It is believed that angled pierced openings or angled grooves improve the accessibility of the electrode portion beneath the landing areas to oxygen.

In addition to the embodiments of FIGS. 5–8 that are specifically directed to enhance product water removal, the electrode substrate structure can be modified to control the retention of product water. Such a modified electrode substrate structure to enhance product water retention would be employed in the portions of the electrode that run too dry or to permit operation of the fuel cell with drier reactant inlet conditions (less humidification). Water retention is generally accomplished by employing a coat of water impermeable or semi-permeable material, such as NAFION perfluorosulfonic ion exchange membrane or a layer of carbon particles on the surface of the electrode substrate to occlude the pores. The water impermeable or semi-permeable material can be employed either on the surface of the electrode substrate facing the oxidant stream or on the surface of the electrode substrate on which the electrocatalyst is subsequently applied.

Figure 9:
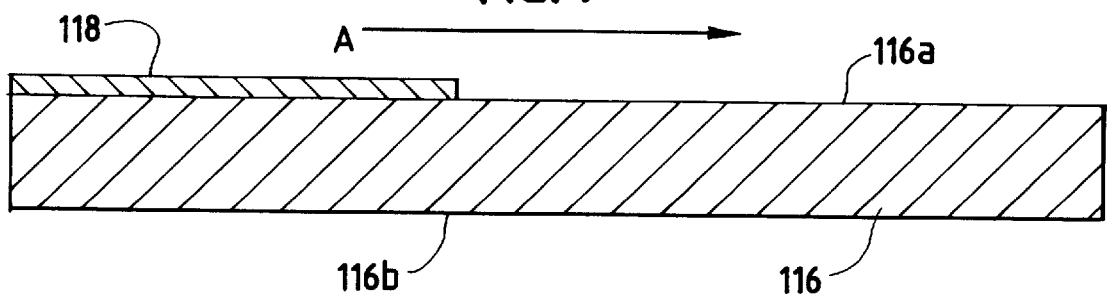
FIG. 9 is a cross-sectional view of a cathode substrate having a fluid impermeable or semi-permeable coating disposed on the surface facing the oxidant flow field, schematically illustrating the oxidant stream flow in the direction of arrow A.

FIG. 9 shows a cathode substrate 116 having a fluid impermeable or semi-permeable coating layer 118 disposed on the surface 116a of cathode substrate 116 facing the oxidant flow field. The oxidant stream flows in the direction of arrow A. Surface 116b has a thin layer of electrocatalyst (not shown), preferably finely comminuted platinum, disposed thereon at the interface with adjacent membrane (see FIG. 2).

Figure 10:
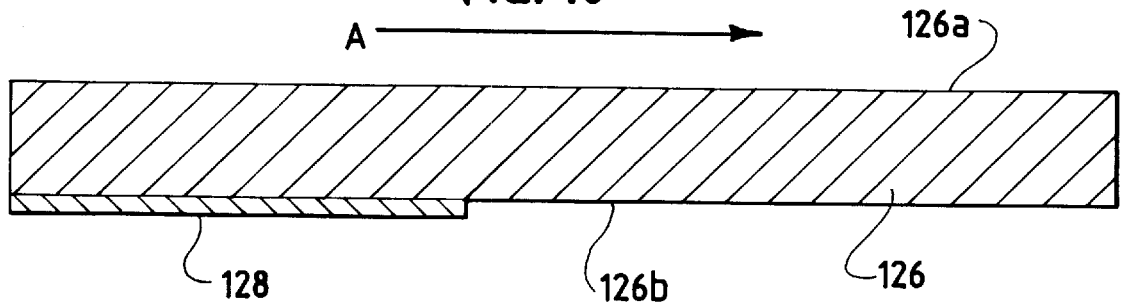
FIG. 10 is a cross-sectional view of a cathode substrate having a fluid impermeable or semi-permeable coating disposed on the surface facing the electrocatalyst, schematically illustrating the oxidant stream flow in the direction of arrow A.

FIG. 10 shows a cathode substrate 126 having a fluid impermeable or semi-permeable coating layer 128 disposed on the cathode surface 126b facing the electrocatalyst. The oxidant stream flows in the direction of arrow A adjacent surface 126a. Surface 126b has a thin layer of electrocatalyst (not shown), preferably finely comminuted platinum, subsequently applied thereon at the interface with adjacent membrane (see FIG. 2).

Figure 11:
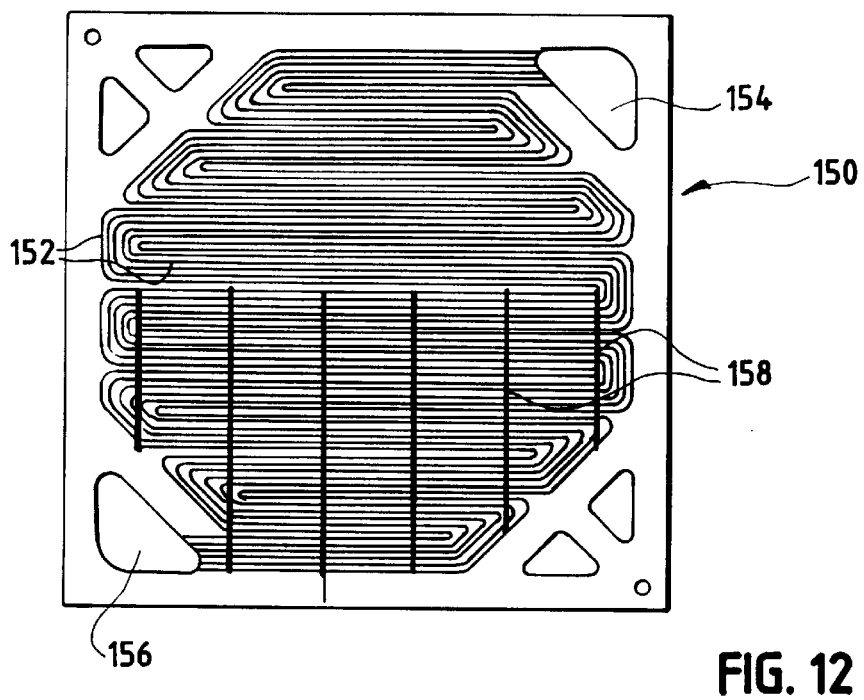
FIG. 11 is a plan view of the cathode separator plate for the fuel cell of FIG. 2, showing superimposed thereon the pattern of channels formed in the portion of the cathode substrate adjacent the oxidant stream outlet.

FIG. 11 shows a cathode flow field/separator plate 150 for fuel cell 30 of FIG. 2. Plate 150 has serpentine oxidant flow channels 152 formed in a major surface thereof for directing an oxidant stream between an oxidant inlet manifold opening 154 and an oxidant outlet manifold opening 156. FIG. 11 shows a plurality of channels 158 formed in the portion of the cathode substrate surface adjacent the oxidant outlet 156.

Product water transport can also be controlled by the use of different types of electrode substrate materials in different regions of the electrochemically active area of the fuel cell to form a hybrid substrate structure. For example, carbon cloth generally exhibits superior oxygen transport properties to carbon fiber paper, but carbon cloth also has disadvantages with respect to carbon fiber paper, for example, poorer processibility under some conditions and tendency to dry the membrane under some operating conditions. Patches of carbon cloth can be substituted in those regions of a carbon fiber paper electrode substrate in which increased product water removal is desired, while retaining the advantages of the carbon fiber paper in the remaining areas. Patch materials other than carbon cloth could also be employed, such as, for example, a lower porosity carbon fiber paper, to decrease the rate of product water transport away from the electrocatalyst layer, or a higher porosity carbon fiber paper to increase the rate of product water transport away from the electrocatalyst layer.

Figure 12:
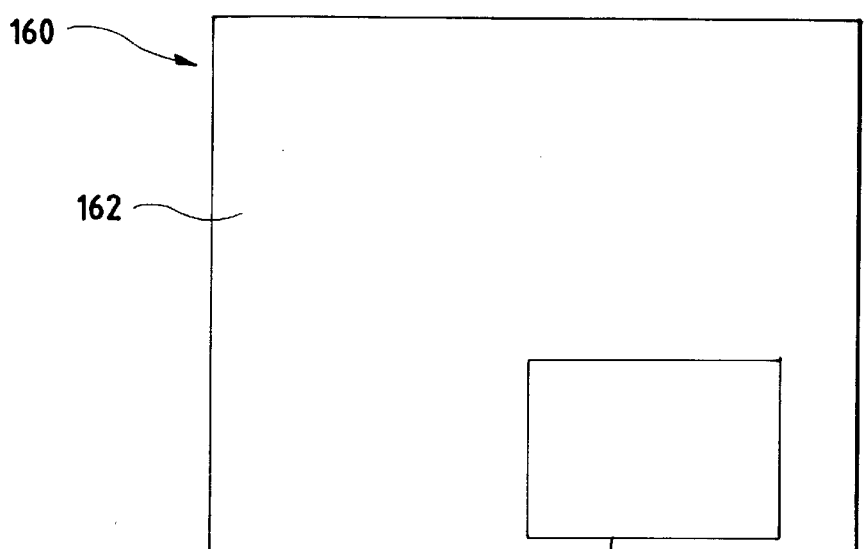
FIG. 12 is a plan view of a cathode substrate comprising a first material having an opening extending between the major surfaces thereof in which a patch of a second material having different reaction product and/or reactant transport properties from the first material is embedded in the opening.

FIG. 12 shows a cathode substrate 160 comprising a first sheet material 162, preferably carbon fiber paper. Cathode substrate 160 has an opening extending between the major surfaces thereof in which a patch of a second material 164, preferably carbon cloth having different water transport properties from the first material, is embedded.

Figure 13:
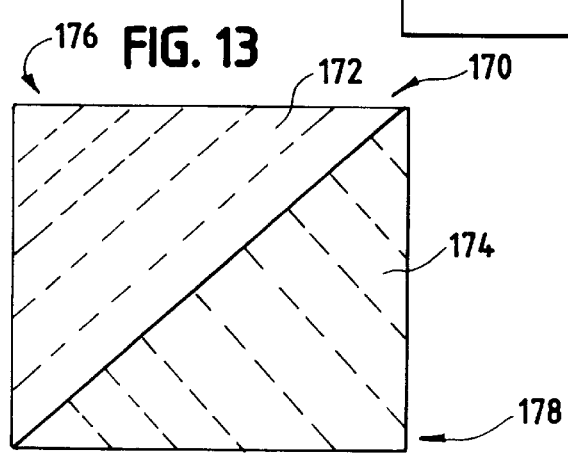
FIG. 13 is a plan view of a cathode substrate in which the substrate portion adjacent the oxidant stream inlet consists of a first material (indicated by a first set broken lines) and the substrate portion adjacent the oxidant stream outlet consists of a second material (indicated by a second set of broken lines perpendicular to the first set) having different reaction product and/or reactant transport properties from the first material.

FIG. 13 shows a cathode substrate 170 in which the portion adjacent the oxidant stream inlet 176 consists of a first material 172 (indicated by a first set of broken lines), preferably carbon fiber paper, and the cathode portion adjacent the oxidant stream outlet 178 consists of a second material 174 (indicated by a second set of broken lines perpendicular to the first set), preferably carbon cloth having different water transport properties from the first material.

In-plane structural nonuniformities in the substrate may be distributed unevenly (that is, irregularly spaced) to impart different mass transport properties in different regions of the electrode substrate. For example, the grooves and channels of the above embodiments may be employed only in particular regions of the electrode substrate, or may be introduced in a graded fashion across the entire substrate.

Figure 14A:
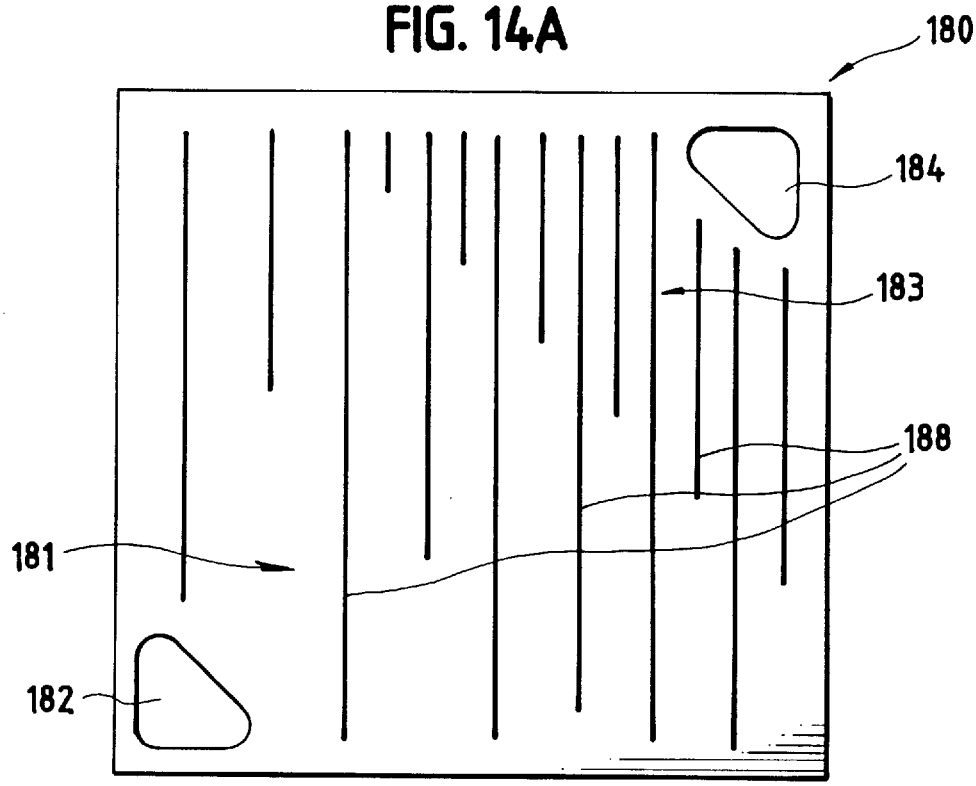
FIG. 14A is a plan view of a cathode substrate having a grooved surface facing the oxidant flow field for the fuel cell of FIG. 2 with the separator plate of FIG. 3, where the grooves are irregularly spaced such that there is a greater occurrence of grooves in the portion of the substrate adjacent the oxidant stream outlet.
Figure 14B:
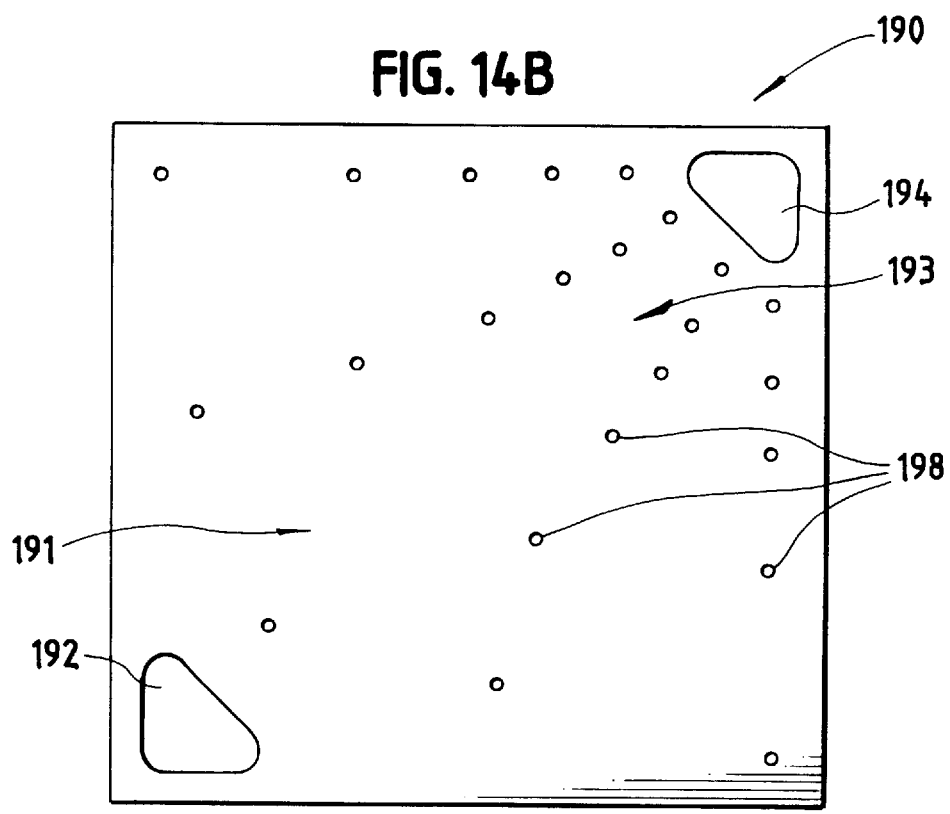
FIG. 14B is a plan view of a cathode substrate having openings piercing both surfaces for the fuel cell of FIG. 2 with the separator plate of FIG. 3, where the openings are irregularly spaced such that there is a greater occurrence of openings in the portion of the substrate adjacent the oxidant stream outlet.

FIGS. 14A and 14B show cathode substrates in which the in-plane structural nonuniformities (grooves and openings, respectively) are irregularly spaced across the substrate.

FIG. 14A shows a cathode substrate 180 for a fuel cell 30 of FIG. 2 with a cathode separator plate 36 of FIG. 3. Cathode substrate 180 has an inlet portion 181 proximate oxidant inlet manifold opening 182 and an outlet portion 183 proximate oxidant outlet manifold opening 184. Cathode substrate 180 further has a grooved surface with channels 188 formed therein, facing the oxidant flow field of the adjacent separator plate 36. The distribution of channels 188 formed in the surface of cathode substrate 180 is graded such that the ratio of the area circumscribed by channels 188 to the surface area of cathode substrate 180 in the outlet portion 183 is greater than the ratio of the area circumscribed by channels 188 to the surface area of cathode substrate 180 in the inlet portion 181.

FIG. 14B shows a cathode substrate 190 for the fuel cell 30 of FIG. 1 with a cathode separator plate 36 of FIG. 3. Cathode substrate 190 has an inlet portion 191 proximate oxidant inlet manifold opening 192 and an outlet portion 193 proximate oxidant outlet manifold opening 194. Cathode substrate 190 further has openings 198 formed therein which pierce both surfaces. The distribution of openings 198 formed in the cathode substrate 190 is graded such that the ratio of the area circumscribed by the openings 198 to the surface area of the substrate in the outlet portion 193 is greater than the ratio of the area circumscribed by the openings 198 to the surface area of the substrate 190 in the inlet portion 191. The outlet portion of the substrate is generally the region in which excess product water tends to accumulate.

The grooved, pierced, and hybrid electrode substrate embodiments have been evaluated to determine the performance of each embodiment. The cathode substrates in two of the tests had structural nonuniformity introduced at regular intervals across the entire electrochemically active area (that is, no uneven distribution or irregular spacing of structural in-plane nonuniformity to optimize fuel cell performance). In the case of grooved substrates, the grooves were formed approximately 0.005 inches deep and approximately 0.020 inches wide with a spacing between grooves of approximately 0.100 inch. In the case of pierced substrates, the pierced openings were formed with a diameter of approximately 0.020 inches with a spacing between openings of approximately 0.100 inches. In the case of hybrid substrates, carbon fiber paper was employed for the inlet portion and carbon cloth as the outlet portion, as illustrated in FIG. 13.

Figure 15:
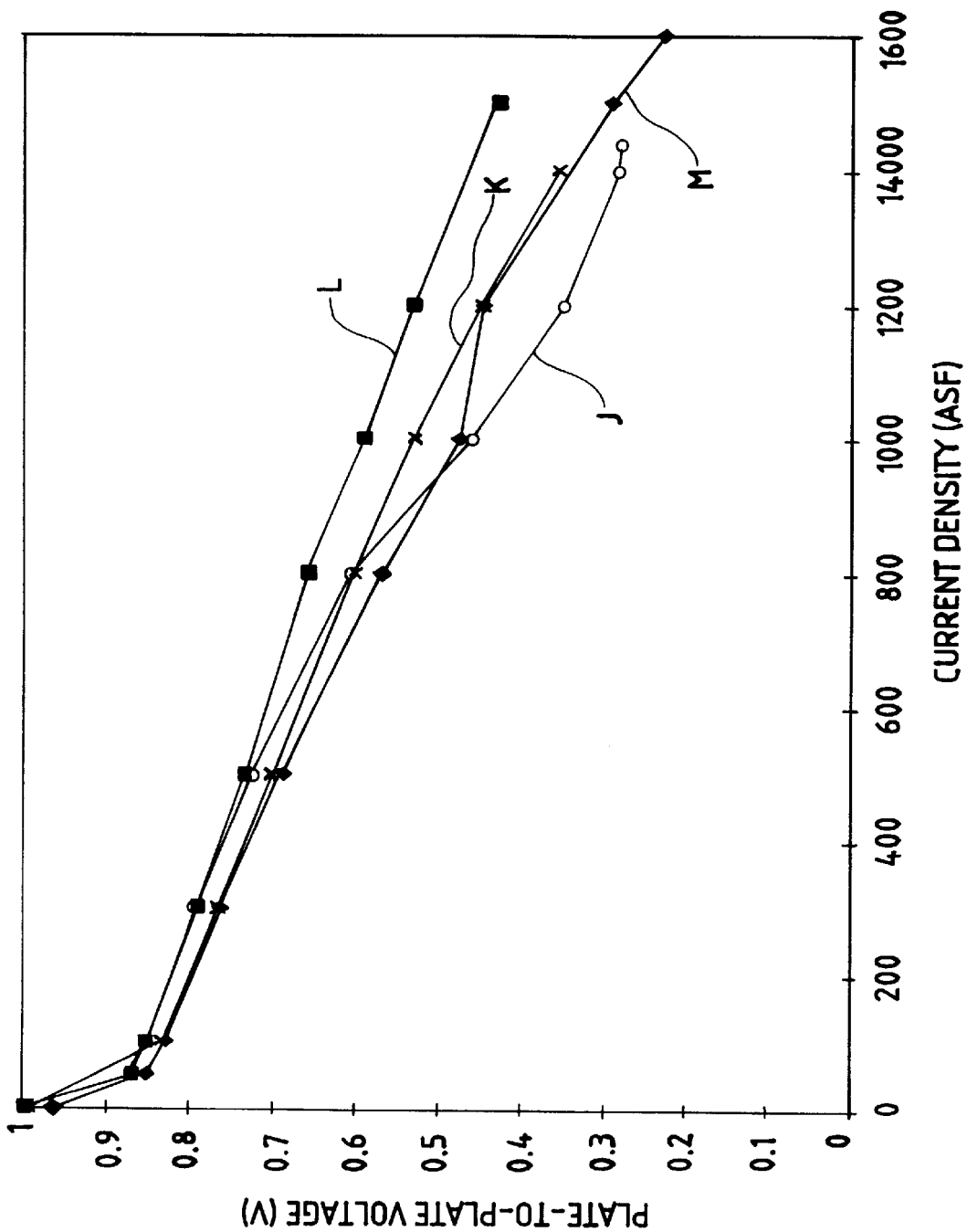
FIG. 15 is a plot of voltage versus current density (amperes per square foot) for the conventional cathode substrate shown in FIG. 4 (plot J), for the one-half carbon fiber paper/one-half carbon cloth cathode substrate shown in FIG. 13 (plot K), for the grooved cathode substrate shown in FIG. 5 (plot L), and for the pierced cathode substrate shown in FIG. 6 (plot M).

FIG. 15 is a plot of voltage versus current density (amperes per square foot) for the conventional cathode substrate shown in FIG. 4 (plot J), for the one-half carbon fiber paper/one-half carbon cloth substrate shown in FIG. 13 (plot K), for the grooved substrate shown in FIG. 5 (plot L), and for the pierced substrate shown in FIG. 6 (plot M).

FIG. 15 shows that, at high current densities (that is, greater than 1000 amps per square foot), the grooved substrate, pierced substrate, and hybrid substrate, demonstrate fuel cell performance superior to that achieved with conventional cathode substrate structures having a uniform in-plane structure. In this regard, the grooved substrate, pierced substrate, and hybrid substrates exhibit output cell voltages which are greater at a given current density than the cell voltage using a conventional cathode substrates. Mass transport limitations tend to be revealed at high current densities because the electrochemical reaction is more sensitive to the concentration of the reactant at the electrocatalyst layer. Greater amounts of reaction product are generated at high current densities. It is advantageous to transport reaction product (water in the case of a hydrogen/oxygen fuel cell) accumulated at the electrocatalyst layer away from the electrocatalyst layer. The increase in performance at high current densities is an indication of the improved mass transport of reactant and reaction product achieved with cathode substrates having an in-plane nonuniform structure.

Figure 16:
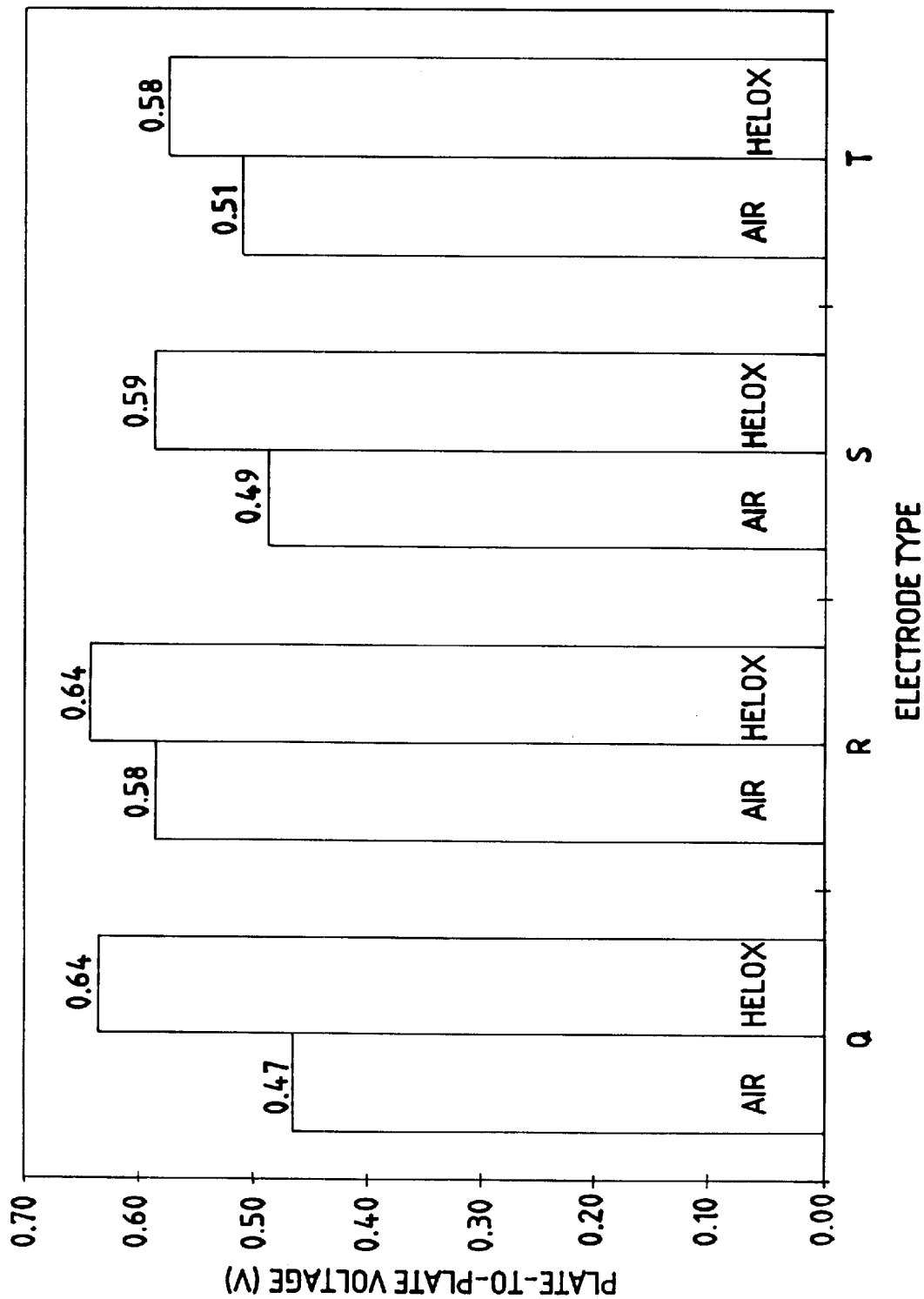
FIG. 16 is a bar graph showing the fuel cell voltages achieved using oxygen-containing air and a mixture of 21% oxygen/79% helium for each of the conventional cathode substrate shown in FIG. 4 (group Q), the grooved cathode substrate shown in FIG. 5 (group R), the pierced cathode substrate shown in FIG. 6 (group S), and the one-half carbon fiber paper/one-half carbon cloth cathode substrate shown in FIG. 13 (group T).

FIG. 16 is a bar graph showing the fuel cell voltages achieved using each of the conventional substrate shown in FIG. 4 (group Q), the grooved substrate shown in FIG. 5 (group R), the pierced substrate shown in FIG. 6 (group S), and the one-half carbon fiber paper/one-half carbon cloth substrate shown in FIG. 13 (group T). FIG. 16 reports the output cell voltage, at a current density of 1000 amps per square foot, for a single cell containing a conventional cathode substrate Q with an essentially uniform in-plane structure, and three cathodes R, S and T, each having an in-plane nonuniform structure. Each of cathodes substrates Q, R, S and T were operated on two different oxidant stream compositions: air (which contains 21% oxygen with the balance substantially nitrogen) and "helox" (79% helium/ 21% oxygen). Thus, in the helox and air streams, the concentration of oxygen, the reactive constituent, is the same. However, oxygen diffuses more readily (faster) through helium than through air, which is mainly composed of nitrogen. Thus, the diffusion coefficient of oxygen is greater in helium than in nitrogen. Consequently, for a given electrode, the difference between the output cell voltage obtained using air and the output cell voltage obtained using helox is indicative of the extent to which oxygen diffusion problems exist. These differences are reported in Table 1 for each of the four subject cathode substrates.

TABLE 1

|  | Conventional Substrate | Pierced Substrate | Grooved Substrate | Hybrid Substrate |
|---|---|---|---|---|
| ΔVoltage | 170 mV | 100 mV | 59 mV | 65 mV | where ΔVoltage, expressed in millivolts, is the output cell voltage obtained using helox minus the output cell voltage obtained using air, at a current density of 1000 amps per square foot.

The data in FIG. 16 and Table 1 indicate that the grooved substrate, pierced substrate, and hybrid substrate exhibit less gain in performance (voltage) on switching from air to helox, than the gain in performance exhibited by the conventional cathode substrate. This in turn indicates that the grooved, pierced and hybrid substrates (that is, those having an in-plane nonuniform structure) have superior oxygen transport characteristics relative to conventional cathode substrates (that is, those having an in-plane structure that is essentially uniform, on a macroscopic scale).

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. In an electrochemical fuel cell comprising:
   (a) an anode separator plate having a pair of oppositely facing major planar surfaces, a fuel stream inlet and a fuel stream outlet;
   (b) a cathode separator plate having a pair of oppositely facing major planar surfaces, an oxidant stream inlet and an oxidant stream outlet;
   (c) a membrane electrolyte interposed between said anode separator plate and said cathode separator plate;
   (d) an anode substrate interposed between said anode separator plate and said membrane electrolyte, said anode substrate having a pair of oppositely facing major planar surfaces and a quantity of anode catalyst disposed on one of the major planar surfaces thereof, said anode catalyst promoting oxidation of a fuel stream and defining an anode electrochemically active area, said anode substrate having an anode inlet region adjacent said fuel stream inlet and an anode outlet region adjacent said fuel stream outlet;
   (e) a cathode substrate interposed between said cathode separator plate and said membrane electrolyte, said cathode substrate having a pair of oppositely facing major planar surfaces and a quantity of cathode catalyst disposed on one of the major planar surfaces thereof, said cathode catalyst promoting reduction of an oxidant stream to form a reaction product and defining a cathode electrochemically active area, said cathode substrate having a cathode inlet region adjacent said oxidant stream inlet and a cathode outlet region adjacent said oxidant stream outlet;

the improvement comprising:
   at least one of said anode substrate and said cathode substrate having localized in-plane nonuniform structure in its electrochemically active area for imparting uneven fluid transport properties between its inlet region and its outlet region.

2. The electrochemical fuel cell of claim 1 wherein said localized in-plane nonuniform structure is graded across said electrochemically active area of said at least one substrate.

3. The electrochemical fuel cell of claim 1 wherein said fuel stream comprises hydrogen, said oxidant stream comprises oxygen, and said reaction product comprises water.

4. The electrochemical fuel cell of claim 1 wherein said fuel stream comprises methanol and said oxidant stream comprises oxygen.

5. The electrochemical fuel cell of claim 1 wherein said localized in-plane nonuniform structure comprises at least one channel formed on the major surface of said cathode substrate facing said cathode separator plate.

6. The electrochemical fuel cell of claim 5 wherein a first ratio of the area circumscribed by said at least one channel to said cathode substrate surface area in said cathode outlet region is greater than a second ratio of the area circumscribed by said at least one channel to said cathode substrate surface area in said cathode inlet region.

7. The electrochemical fuel cell of claim 5 wherein said at least one channel comprises a plurality of channels.

8. The electrochemical fuel cell of claim 1 wherein said localized in-plane nonuniform structure comprises at least one opening formed in said electrochemically active area of said cathode substrate, said at least one opening extending between both major surfaces of said cathode substrate, said at least one opening not extending through said membrane electrolyte.

9. The electrochemical fuel cell of claim 8 wherein said at least one opening comprises a plurality of openings.

10. The electrochemical fuel cell of claim 9 wherein a first ratio of the area circumscribed by said openings to said cathode substrate surface area in said cathode outlet region is greater than a second ratio of the area circumscribed by said openings to said cathode substrate surface area in said cathode inlet region.

11. The electrochemical fuel cell of claim 8 wherein said at least one opening has a quantity of hydrophilic material disposed therein.

12. The electrochemical fuel cell of claim 8 wherein said at least one opening has a quantity of hydrophobic material disposed therein.

13. The electrochemical fuel cell of claim 1 wherein said cathode substrate comprises a porous electrically conductive layer having a pair of oppositely disposed major planar surfaces, each of said porous electrically conductive layer major planar surfaces having an area, and a coating layer comprising material that is semipermeable to water disposed on a portion of one of said major surfaces of said porous electrically conductive layer, said portion covering an area less than the area of said one of said major surfaces of said porous electrically conductive layer.

14. The electrochemical fuel cell of claim 13 wherein said coating layer is disposed on said cathode inlet region.

15. The electrochemical fuel cell of claim 14 wherein said one of said cathode substrate major surfaces faces said cathode separator plate.

16. The electrochemical fuel cell of claim 14 wherein said one of said cathode substrate major surfaces faces said membrane electrolyte.

17. The electrochemical fuel cell of claim 1 wherein said cathode substrate comprises at least two porous electrically conductive sheet materials arranged in the same plane.

18. The electrochemical fuel cell of claim 1 wherein said cathode substrate comprises a first porous electrically conductive sheet material and wherein said localized in-plane nonuniform structure comprises at least one opening formed in said cathode substrate, said at least one opening extending between both major surfaces of said first sheet material, said at least one opening having a quantity of a second porous electrically conductive sheet material disposed therein.

19. The electrochemical fuel cell of claim 18 wherein said at least one opening is formed in said cathode outlet region.

20. The electrochemical fuel cell of claim 18 wherein said first porous electrically conductive sheet material is carbon fiber paper and said second porous electrically conductive sheet material is carbon cloth.

21. The electrochemical fuel cell of claim 18 wherein said first porous electrically conductive sheet material is carbon fiber paper having a first porosity and said second porous electrically conductive sheet material is carbon fiber paper having a second porosity.

22. The electrochemical fuel cell of claim 1 wherein the major planar surface of said anode separator plate facing said anode substrate comprises at least one channel for directing said fuel stream between said fuel stream inlet and said fuel stream outlet, and the major planar surface of said cathode separator plate facing said anode substrate comprises at least one channel for directing said oxidant stream between said oxidant stream inlet and said oxidant stream outlet.

23. The electrochmical fuel cell of claim 22 wherein said localized in-plane nonuniform structure comprises at least one opening formed in said electrochemically active area of said cathode substrate, said at least one opening not extending through said membrane electrolyte, and each of said at least one opening extends angularly between both of said cathode substrate major surfaces from a point adjacent said at least one channel formed in the major surface of said cathode separator plate facing said cathode substrate.

24. An electrode substrate for an electrochemical fuel cell, said electrode substrate comprising porous electrically conductive sheet material and having a pair of oppositely disposed major planar surfaces, said electrode substrate further having localized in-plane nonuniform structure, said in-plane nonuniform structure comprising at least one opening formed in said electrode substrate, said at least one opening extending between both major surfaces of said electrode substrate, said at least one opening imparting different mass transport properties in different regions of said electrode substrate.

25. The electrode substrate of claim 24 wherein said at least one opening comprises a plurality of openings.

26. The electrode substrate of claim 24 wherein said at least one opening has a quantity of hydrophilic material disposed therein.

27. The electrode substrate of claim 24 wherein said at least one opening has a quantity of hydrophobic material disposed therein.

28. An electrode substrate for an electrochemical fuel cell, said electrode substrate comprising a porous electrically conductive layer having a pair of oppositely disposed major planar surfaces, each of said porous electrically conductive layer major planar surfaces having an area, and a coating layer comprising material that is semipermeable to water disposed on a portion of one of said major surfaces, said portion covering an area less than the area of said one of said major surfaces.

29. An electrode substrate for an electrochemical fuel cell, said electrode substrate comprising at least two porous electrically conductive sheet materials arranged in the same plane.

30. An electrode substrate for an electrochemical fuel cell, said electrode substrate comprising a first porous electrically conductive sheet material having a pair of oppositely disposed major planar surfaces, said electrode substrate having an in-plane nonuniform structure comprising at least one opening formed in said first sheet material, said at least one opening extending between both major surfaces of said first sheet material, said at least one opening having a quantity of a second porous electrically conductive sheet material disposed therein.

31. The electrode substrate of claim 30 wherein said first porous electrically conductive sheet material is carbon fiber paper and said second porous electrically conductive sheet material is carbon cloth.

32. The electrode substrate of claim 30 wherein said first porous electrically conductive sheet material is carbon fiber paper having a first porosity and said second porous electrically conductive sheet material is carbon fiber paper having a second porosity.

33. A membrane electrode assembly for an electrochemical fuel cell, said membrane electrode assembly comprising a membrane electrolyte interposed between a pair of electrodes, at least one of said electrodes comprising an electrode substrate having a pair of oppositely disposed major planar surfaces and a plurality of openings formed therein, said openings extending between both major surfaces of said electrode substrate.

34. A membrane electrode assembly for an electrochemical fuel cell, said membrane electrode assembly comprising a membrane electrolyte interposed between a pair of electrodes, at least one of said electrodes comprising a porous electrically conductive layer having a pair of oppositely disposed major planar surfaces, each of said porous electrically conductive layer major planar surfaces having an area, and a coating layer comprising material that is semipermeable to water disposed on a portion of one of said major surfaces, said portion covering an area less than the area of said one of said major surfaces.

35. A membrane electrode assembly for an electrochemical fuel cell, said membrane electrode assembly comprising a membrane electrolyte interposed between a pair of electrodes, at least one of said electrodes comprising an electrode substrate comprising at least two porous electrically conductive sheet materials arranged in the same plane.

* * * * *